(12) United States Patent
Khurana et al.

(10) Patent No.: US 10,346,393 B2
(45) Date of Patent: Jul. 9, 2019

(54) AUTOMATIC ENUMERATION OF DATA ANALYSIS OPTIONS AND RAPID ANALYSIS OF STATISTICAL MODELS

(71) Applicant: International Business Machines Corporation, Armonk, NY (US)

(72) Inventors: Udayan Khurana, College Park, MD (US); Srinivasan Parthasarathy, White Plains, NY (US); Venkata N. Pavuluri, New Rochelle, NY (US); Deepak S. Turaga, Elmsford, NY (US); Long H. Vu, White Plains, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 537 days.

(21) Appl. No.: 14/518,506

(22) Filed: Oct. 20, 2014

(65) Prior Publication Data

US 2016/0110362 A1    Apr. 21, 2016

(51) Int. Cl.
*G06F 16/242* (2019.01)
*G06F 16/245* (2019.01)
*G06F 16/248* (2019.01)
*G06F 16/332* (2019.01)
*G06F 16/2455* (2019.01)

(52) U.S. Cl.
CPC ........ *G06F 16/242* (2019.01); *G06F 16/245* (2019.01); *G06F 16/248* (2019.01); *G06F 16/24553* (2019.01); *G06F 16/3323* (2019.01)

(58) Field of Classification Search
CPC ........ G06F 17/30389; G06F 17/30424; G06F 17/30483; G06F 17/30554; G60F 16/242; G60F 16/245; G60F 16/24553; G60F 16/248; G60F 16/26; G60F 16/287; G60F 16/3323
See application file for complete search history.

(56) References Cited

U.S. PATENT DOCUMENTS

| | | | |
|---|---|---|---|
| 4,821,211 A * | 4/1989 | Torres | G06F 3/0482 345/581 |
| 7,587,383 B2 | 9/2009 | Koo et al. | |
| 7,805,443 B2 | 9/2010 | Konig et al. | |
| 8,589,337 B2 | 11/2013 | Gibson et al. | |
| 2002/0103793 A1* | 8/2002 | Koller | G06F 17/30469 |

(Continued)

FOREIGN PATENT DOCUMENTS

EP    0317480 A2 *  5/1989  ........... G06F 3/0482

OTHER PUBLICATIONS

List of IBM Patents or Patent Applications Treated as Related; Date File: Oct. 20, 2014, pp. 1-2.

(Continued)

*Primary Examiner* — James E Richardson
(74) *Attorney, Agent, or Firm* — Cantor Colburn LLP; David Zwick

(57) ABSTRACT

Embodiments relate to analyzing dataset. A method of analyzing data is provided. The method obtains a description of a dataset. The method automatically generates a plurality of analysis options from the description of the dataset. The method generates a plurality of queries based on the analysis options. The method deploys the queries on the dataset to build a plurality of statistical models from the dataset.

5 Claims, 8 Drawing Sheets

(56) References Cited

U.S. PATENT DOCUMENTS

| | | | |
|---|---|---|---|
| 2005/0229001 A1* | 10/2005 | Brown | G06F 21/604 |
| | | | 713/182 |
| 2010/0211588 A1 | 8/2010 | Jiang et al. | |
| 2013/0262348 A1* | 10/2013 | Kiran | G06Q 50/01 |
| | | | 706/11 |
| 2013/0345999 A1* | 12/2013 | Hafen | G01R 21/133 |
| | | | 702/60 |
| 2014/0244447 A1* | 8/2014 | Kim | G06Q 30/0643 |
| | | | 705/27.2 |
| 2014/0280065 A1* | 9/2014 | Cronin | G06F 17/30539 |
| | | | 707/722 |
| 2015/0269157 A1* | 9/2015 | Biem | G06N 99/005 |
| | | | 707/603 |
| 2016/0371288 A1* | 12/2016 | Le Biannic | G06F 17/30973 |
| 2017/0004173 A1* | 1/2017 | Simitsis | G06F 17/30463 |

OTHER PUBLICATIONS

Udayan Khurana, et al.,"Automatic Enumeration of Data Analysis Options and Rapid Analysis of Statistical Models," U.S. Appl. No. 14/744,204, dated Jun. 19, 2015.

Grace Period Disclosure—Khurana et al.; "READ: Rapid Exploratory Analysis of Data"; Paper presented at the Proceedings of the 17th International Conference on Extending Database Technology, Athens, Greece; Mar. 24-28, 2014; 4 pages.

\* cited by examiner

| Att Name | Time | Trans_ID | Src | Dest | Query | D_name | IP | Q_Type |
|---|---|---|---|---|---|---|---|---|
| Att Type | Timestamp | String | String | String | Boolean | String | String | Enum |
| Is Entity? | false | false | true | true | false | true | true | false |
| Entity | | | IBMhost | IBMhost | | Domain | Ext_IP | |
| | | | | | | | | {ssh, http} |

FIG. 2

```
rule "Create Boolean Filters"
// Create atomic filters from boolean attributes
        when
                $t : Table (isSourcable == true, $attribs: schema) //possible tables
                $a : Attribute(attType == "Boolean") from $attribs //boolean attributes
        then
                insert(new Filter($t, $a.attName + " == true"));
                insert(new Filter($t, $a.attName + " == false"));
end
```

FIG. 3

AUTOMATIC ENUMERATION OF DATA ANALYSIS OPTIONS AND RAPID ANALYSIS OF STATISTICAL MODELS

STATEMENT REGARDING FEDERALLY SPONSORED RESEARCH OR DEVELOPMENT

This invention was made with Government support under H98230-11-C-0276 awarded by Department of Defense. The Government has certain rights in this invention.

STATEMENT REGARDING PRIOR DISCLOSURES BY THE INVENTOR OR A JOINT INVENTOR

The following disclosure is submitted under 35 U.S.C. 102(b)(1)(A): DISCLOSURE: Khurana, U., Parthasarathy, S., & Turaga, D., (2014, Mar. 24-28). *READ: Rapid Exploratory Analysis of Data*. Paper presented at the Proceedings of the 17th International Conference on Extending Database Technology, Athens, Greece; 4 pages.

BACKGROUND

The present invention relates generally to data analysis, and more specifically, automatically enumerating data analysis options for building statistical models from a given dataset and rapidly analyzing the statistical models.

Exploratory Data Analysis (EDA) is a data analysis approach. In EDA, a given dataset (i.e., a collection of data) is analyzed to build statistic models, and the models are examined to draw useful conclusions or insights about the dataset. Hence, EDA is different from model fitting or hypothesis testing in the sense that the data analyst is exploring the dataset to discover insights from the dataset. EDA involves slicing and dicing a given dataset, creating different types of models to gain insights through the examination of the created models. Useful results are found through the observation of anomalies, outliers, relationships, dependencies, correlations or other interesting patterns in the models.

Since its introduction, EDA has been prevalent across a wide variety of domains such as cyber security, online consumer behavior analysis, healthcare, system failure analysis, to name a few. For instance, the analysis of cyber monitoring data allows for identifying malicious hosts or predicting threats in a network. Analyzing the consumer behavior through user action logs, i.e., browsing histories, search terms, clicks, etc., often helps the analyst in characterizing consumer preferences. In healthcare, the similarity of a patient's data to relevant cases in the past may be an early indicator of a need for further investigation and diagnosis.

SUMMARY

Embodiments include a computer program product, a method, and a system for accelerating data analysis. According to an embodiment of the present invention, a computer program product for analyzing data is provided. The computer program product comprises a computer readable storage medium having program instructions embodied therewith. The program instructions readable by a processing circuit cause the processing circuit to perform a method. The method obtains a description of a dataset. The method automatically generates a plurality of analysis options from the description of the dataset. The method generates a plurality of queries based on the analysis options. The method deploys the queries on the dataset to build a plurality of statistical models from the dataset.

According to another embodiment of the present invention, a computer system for analyzing statistical models is provided. The computer system comprises a memory having computer readable instructions and a processor configured to execute the computer readable instructions. The instructions comprise obtaining a pool of statistical models to analyze. The instructions further comprise ranking the statistical models in an order of decreasing interest to a user. The instructions further comprise automatically grouping a highest ranked model and a set of other ranked models into a cluster based on similarities of the other ranked models to the highest ranked model. The instructions further comprise presenting the cluster of models to the user to interpret.

According to a further embodiment of the present invention, a method of analyzing data is provided. The method obtains a description of a dataset. The method automatically generates a plurality of analysis options from the description of the dataset. The method generates a plurality of queries based on the analysis options. The method deploys the queries on the dataset to build a plurality of statistical models from the dataset.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 2 depicts a description for a dataset according to some embodiments of the invention;

FIG. 3 depicts a set of rules according to some embodiments of the invention;

DETAILED DESCRIPTION

Figure 1:
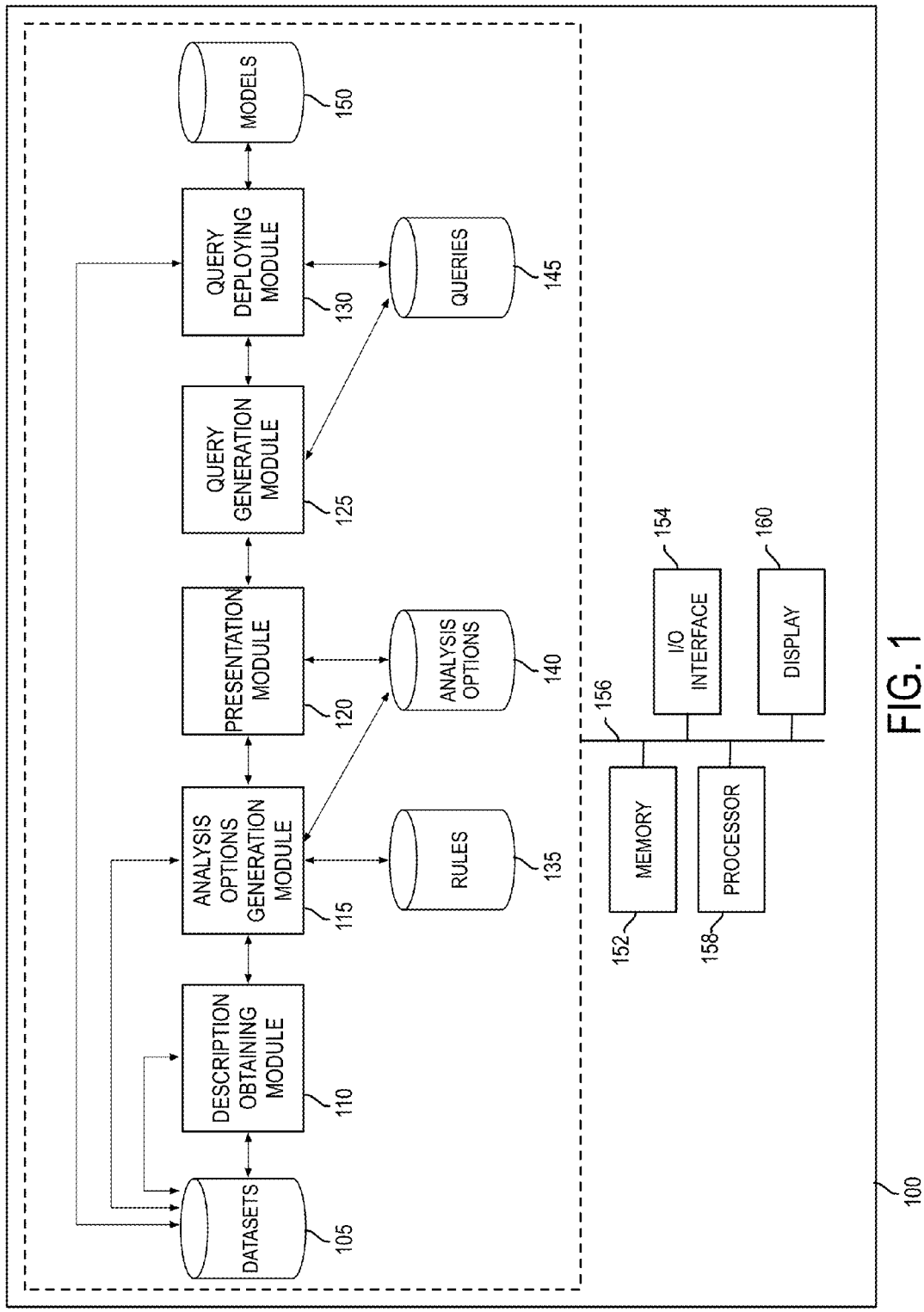
FIG. 1 depicts a data analysis system according to some embodiments of the invention.

In a typical process of Exploratory Data Analysis (EDA), an analyst constructs statistical models from a given dataset and then examines the models. The analyst repeats the construction and examination of models until some useful insights are found (or until the analyst runs out of models to examine). As an example, a given dataset include domain name service (DNS) query log in a database format. The dataset captures all the DNS name lookup queries (e.g., nslookup queries) made by different hosts of a network for several months. The analyst writes database queries (e.g., Structured Query Language (SQL) queries) one by one to run on the dataset in order to construct different models (e.g., histograms). Many models constructed in the process do not yield any interesting observations. That is, an analyst may not have any interesting insights to draw from these models. When a constructed model shows a host that was involved in a significantly larger number of DNS queries than the other hosts in the network, the analyst may conclude that the anomalous host is likely to be a DNS server while the rest are DNS clients within that network.

One of the drawbacks for performing the typical EDA process described above is that it takes a large amount of time to generate a wide variety of models to discover meaningful insights from the dataset. Specifically, it takes time for the analyst to write each query or procedure for model generation. The analyst may also have to wait for a model to be computed from deploying a query on the dataset. This wait may be very long if dataset is very large (e.g., billions of DNS query log entries). Moreover, upon obtaining models, the analyst has to examine each model to see if the analyst is able to make any interesting observations. If there are any interesting observations made, the analyst records the observations. If the amount of time given to the analyst is limited, the analyst may not be able to build and examine all possible models, some of which may have lead to interesting observations on the dataset.

The effectiveness of the typical EDA process is also affected by the skill set of the analyst in terms of data management, data analysis, query construction and familiarity to statistical or visualization tools. Therefore, a skilled analyst is needed for effective exploration of a large dataset to reach to useful, relevant conclusions about the dataset.

The systems and methods of some embodiments of the invention enables an analyst to explore a broad set of models for a given dataset quickly without going through an iterative, manual process of generating and analyzing models. Specifically, the systems and methods automatically generate a plurality of data analysis options for a given dataset based on a description of the dataset, generate queries for building models based on the data analysis options, and deploy the queries on the dataset to construct models.

The systems and methods of some embodiments also enable an analyst to discover insights from the dataset rapidly. Specifically, the systems and methods automatically rank the models based on predetermined ranking metrics, automatically group the models into clusters of models based on predetermined similarity metrics and rank and present to the analyst a few clusters that may lead into useful, interesting insights of the dataset.

FIG. 1 depicts a data analysis system 100 that automatically generates queries to deploy on a given dataset based on a description of the dataset, in order to build statistical models from the dataset. In some embodiments, the data analysis system 100 includes a datasets repository 105, a description obtaining module 110, an analysis option generation module 115, a presentation module 120, a query generation module 125, a query deploying module 130, a rules repository 135, an analysis options repository 140, a queries repository 145 and a models repository 150.

The datasets repository 105 stores datasets to analyze. The datasets stored in the datasets repository 105 are in many different formats, which may be manipulated using different data manipulation languages (e.g., SQL, Search Processing Language (SPL), HiveQL, Pig, Jaql, etc.). For instance, a dataset may be in a database format such that specific data may be retrieved by executing database queries (e.g., SQL queries) on the dataset. Also stored in the datasets repository 105 along with the datasets are descriptions, specifications or meta-data of the datasets (e.g., database schema) that describe the datasets. In some embodiments, the description of a dataset includes database schema, which specifies the structure of a database. A database schema defines the tables, the fields in each table, and the relationship between fields and tables when the dataset is stored in a relational database format.

FIG. 2 shows an example description of a dataset. Specifically, the first and second rows 205 and 210 of a table 200 shown in FIG. 2 describe attribute names and attribute data types (e.g., String, Boolean, Enumerated, etc.), respectively. The third and fourth rows 215 and 220 are for entity annotation. Specifically, the third row 215 indicates whether an attribute is an entity, and the fourth row 220 specifies what the entity is. The fifth row 225 specifies the range of an attribute. In some embodiments, the data analysis system 100 allows a user to edit the table 200 by populating the table or adding/removing columns. It is to be noted that the table 200 is just an example format for the description of a dataset. In different embodiments, different formats may be used to describe a given dataset.

Referring back to FIG. 1, the description obtaining module 110 obtains the description of a dataset to analyze, from the datasets repository 105. The analysis option generation module 115 then automatically generates all possible analysis options for the dataset based on the description of the dataset. An analysis option for a dataset specifies a manner in which to implement a query to deploy on a dataset to build a model. For instance, an analysis option specifies a combination of data filtering conditions, database clauses (e.g., joins, group by, attribute for aggregation), statistical functions (e.g., counts, entropy) and model-specific functions (e.g., a binning strategy for histograms) that may be applied to the dataset to build a model.

The analysis option generation module 115 applies a set of rules stored in the rules repository 135 to the description of the dataset to enumerate analysis options. In some embodiments, the rules used by the analysis option generation module 115 are predetermined and stored in the rules repository 135. The rules stored in the rules repository 135 may be used for analyzing other datasets. FIG. 3 shows an example rule 300 written in Drools. The rule 300 creates two filter conditions (i.e., att.name=true and att.name=false) for the table 200 of FIG. 2 based on an attribute of type Boolean. The rule 300 is written for the attribute type and not for specific attributes. Also, the rule 300 does not mandate the presence of attributes of type Boolean, but the rule activated if there is an object in the table 200 satisfying the when clause of the rule.

Figure 4:
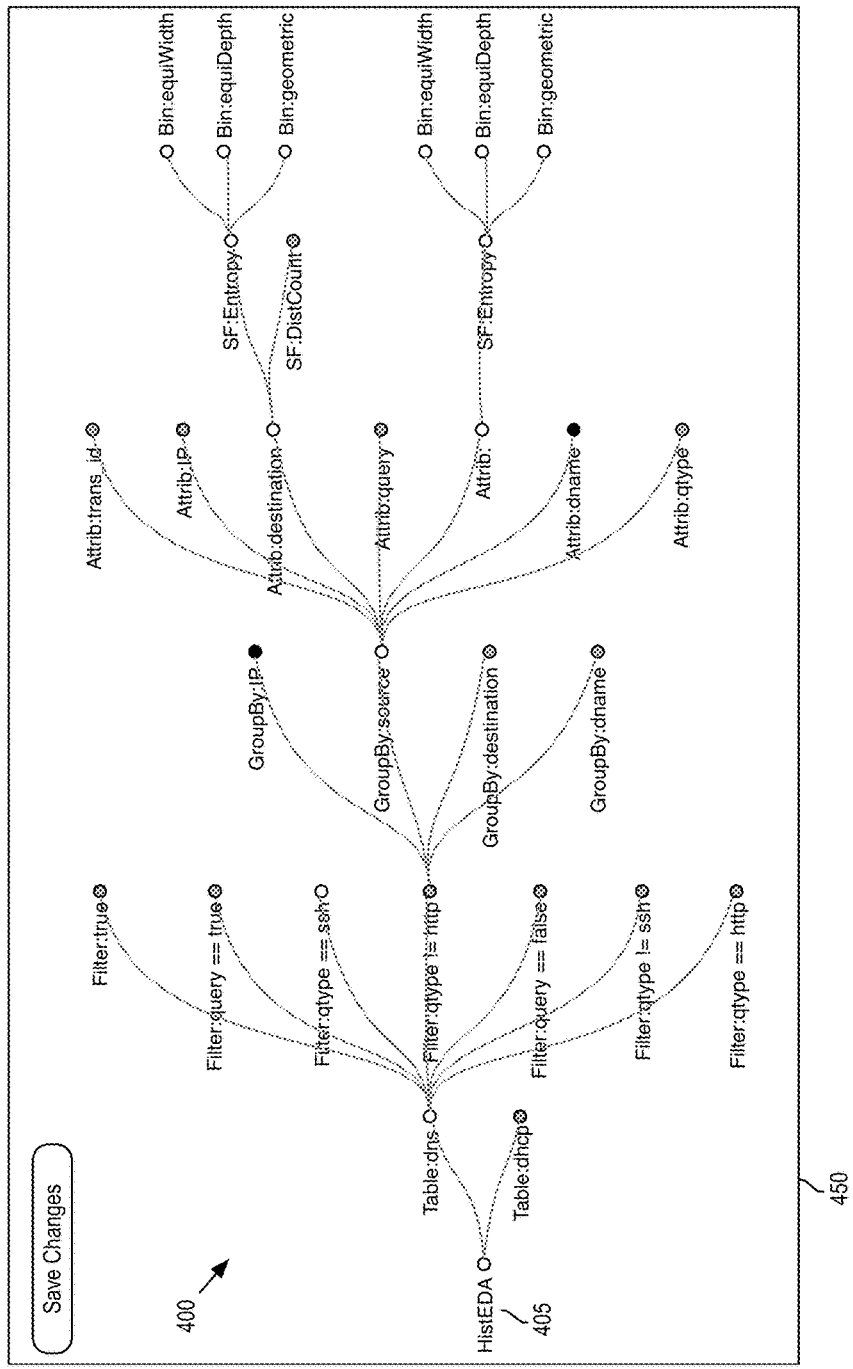
FIG. 4 depicts a set of analysis options according to some embodiments of the invention.

Referring to FIG. 1 again, the analysis option generation module 115 stores the generated analysis options for the dataset in the analysis options repository 140. The analysis options stored in the analysis options repository 140 may be used for analyzing other datasets. The presentation module 120 of some embodiments then presents the generated analysis options in a tree layout and allows a user (e.g., an analyst) to browse and select analysis options. FIG. 4 illustrates an example set of analysis options displayed in a tree 400 in a user interface (UI) tool 450. As shown, the tree 400 has a root node 405, which represents a particular dataset. From the root 405, the tree 400 branches out based on different data filtering conditions, database clauses, statistical functions and model-specific functions generated by running a set of rules by the analysis option generation module 115. Each path from the root node 405 to a leaf node represents an analysis option. In some embodiments, the UI tool 450 allows the user to eliminate certain analysis options by pruning out certain branches of the tree 400.

Figure 5:
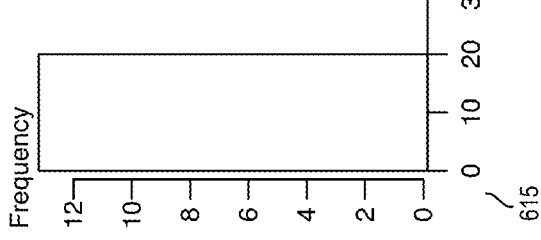
FIG. 5 depicts a set of queries according to some embodiments of the invention.

Referring back to FIG. 1, the query generation module 125 automatically generates a set of queries to deploy on the dataset once the analysis options for the dataset are finalized. The query generation module 125 generates one query per each analysis option based on the data filtering conditions, database clauses, statistical functions and model-specific functions included in the analysis option. In some embodiments, a query that the query generation module 125 generates is in the form of a database query. FIG. 5 illustrates example queries 505, 510 and 515 in the SQL query format. The example queries 505, 510 and 515 are generated from the analysis options shown in FIG. 4.

Referring back to FIG. 1, the query generation module 125 of some embodiments optimizes the generated queries by merging queries. For instance, the query generation module 125 merges those queries with the same filter and "group by" conditions into one composite query with multiple projection operations. The query generation module 125 stores the queries in the queries repository 145. The queries stored in the queries repository 145 may be used for analyzing other datasets.

Figure 6:
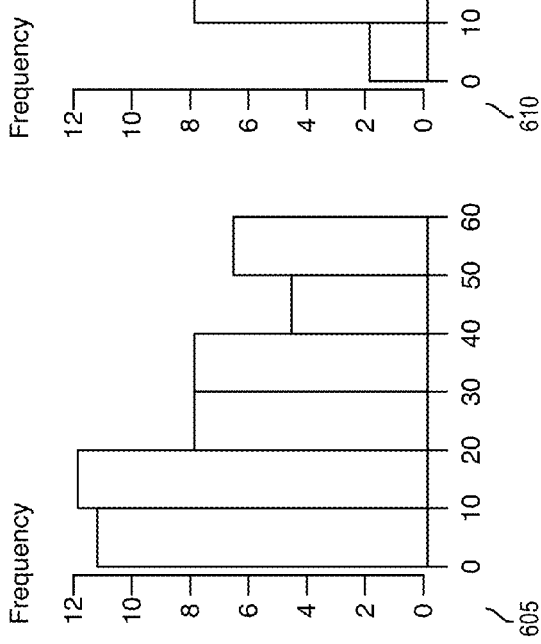
FIG. 6 depicts a set of models according to some embodiments of the invention.

The query deploying engine 130 deploys the queries generated and optimized by the query generation modules 125 to build models. FIG. 6 illustrates example models 605, 610 and 615 that result from deploying the database queries 505, 510 and 515 of FIG. 5, respectively. The query deploying engine 130 stores the models in the models repository 150.

Automatically generating queries to deploy on a given dataset based on a description of the dataset and building models from the dataset are some of the improvements that the embodiments of the invention provide over how EDA has been done so far—an analyst manually composing and deploying queries to build models.

As used herein, the terms module, sub-module and engine may refer to an application specific integrated circuit, an electronic circuit, a processor (shared, dedicated, or group) and memory that executes one or more software or firmware programs, or a combinational logic circuit in a server. For example, in some embodiments, the analysis options generation module 115 may be communicatively connected (e.g., through a bus 156) to a memory 152 to load and use the rules. The presentation module 120 may use an I/O interface 154 to facilitate user interaction with the UI tool 400. The presentation module 120 may also use a display 160 to present the analysis options to the user. The query deploying engine 130 may use a processor 158 to deploy queries. In some embodiments, the modules of the data analysis system 100, namely the datasets repository 105, the description obtaining module 110, the analysis option generation module 115, the presentation module 120, the query generation module 125, and the query deploying module 130 may be combined or further partitioned. Also, the modules of the data analysis system 100 may be implemented in more than one physical machine in a distributed fashion.

Figure 7:
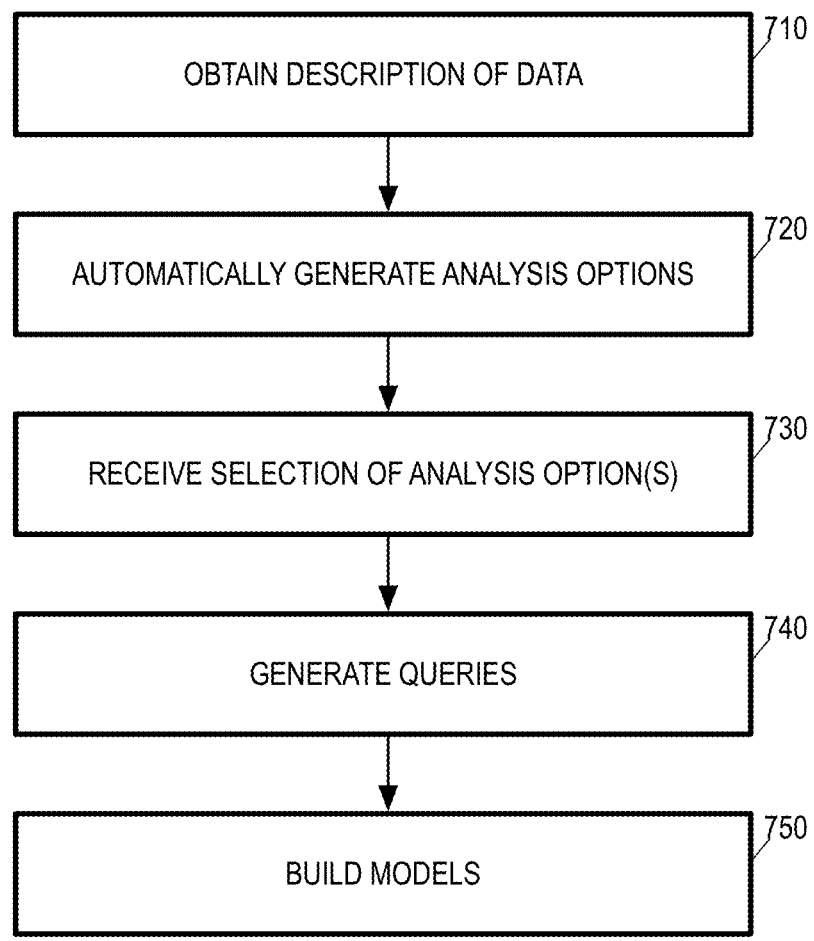
FIG. 7 depicts a process flow for automatically generating models from a dataset according to some embodiments of the invention.

FIG. 7 illustrates a process flow for automatically generating models from a given dataset. In some embodiments, the data analysis system 100 of FIG. 1 performs the process flow shown in FIG. 7. At block 710, the data analysis system 100 obtains a description of the dataset to analyze. At block 720, the data analysis system 100 automatically generates a set of analysis options for the dataset using a set of predetermined rules. Specifically, the data analysis system 100 applies the rules to the description of the dataset to generate the analysis options.

At block 730, the data analysis system 100 optionally presents the generated analysis options for the dataset and receives user inputs for eliminating certain analysis options. The data analysis system 100 of some embodiments provides a UI tool that allows the user to remove any analysis options that the user wishes not to use to analyze the dataset.

At block 740, the data analysis system 100 automatically generates queries from the analysis options. The data analysis system 100 then deploys at block 750 the queries on the dataset to build a set of models for the user to analyze.

Figure 8:
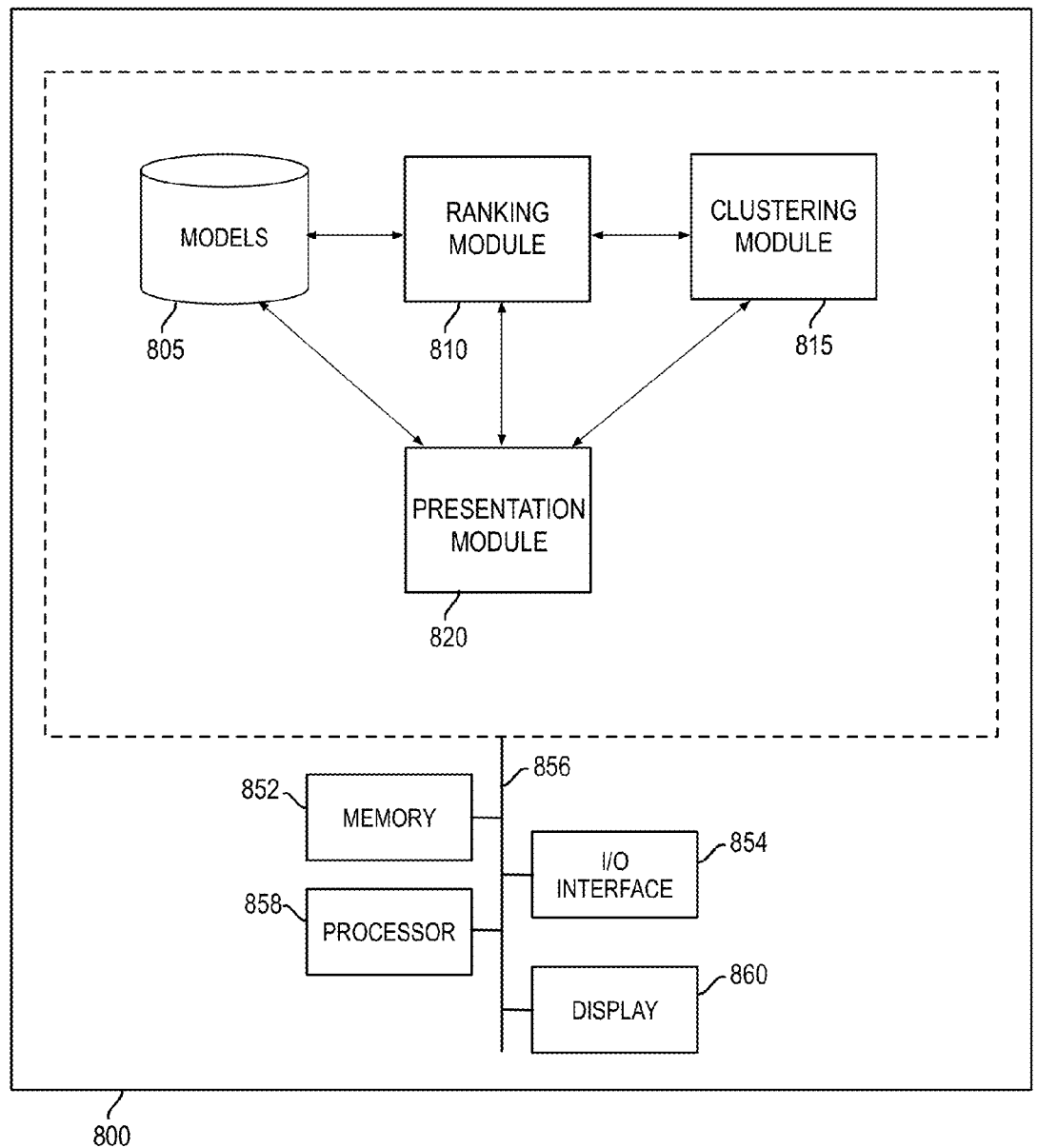
FIG. 8 depicts a model analysis system according to some embodiments of the invention.

FIG. 8 depicts a model analysis system 800 that rapidly and automatically analyzes a large number of models generated for a dataset. In some embodiments, the model analysis system 800 includes a models repository 805, a ranking module 810, a clustering module 815, and a presentation module 820.

The models repository 805 stores a pool of models for a dataset to analyze. In some embodiments, the models stored in the models repository 805 may be generated by the data analysis system 100 of FIG. 1, which automatically generates the models from a dataset. The models stored in the models repository 805 may also be generated by database analysts manually using various tools—e.g., by manually writing database queries and manually deploying the queries on a dataset from which to discover insights.

The ranking module 810 ranks the models for the dataset stored in the models repository 805 in the order of a user's interest. Specifically, in some embodiments, the ranking module 810 uses a set of predefined ranking metrics to measure the level of interest that the user may have in a model. For instance, the ranking metrics that the ranking module 810 may use include skewness, entropy and sparsity metrics. Skewness is a measure of the symmetry of the statistical distribution of a variable about its mean value. When the ranking module 810 uses the skewness metric, the ranking module 810 of some embodiments ranks the models in the order of higher to lower skewness. Entropy is a measure of biasedness of the distribution of a variable. The entropy is lower when the distribution is less biased and is higher when the distribution is more biased. When the ranking module 810 uses the entropy metric, the ranking module 810 of some embodiments ranks the models in the order of the lower entropy to the higher entropy. Sparsity is a measure of the number of non-zero values of a variable in a model. When the ranking module 810 uses the sparsity metric, the ranking module 810 of some embodiments ranks the models in the order of more non-zero values to less non-zero values.

The clustering module 815 groups the models into clusters of similar models. Specifically, in some embodiments, the clustering module 815 selects the highest ranked model identified by the ranking module 810 and then finds a set of models that is statistically similar to the highest ranked model. In some embodiments, the clustering module 815 uses predefined similarity metrics to measure closeness of a model to the highest ranked model. The similarity metrics include any metrics that tells similarity between two models. Examples of similarity metrics that the clustering module 815 may use include Kolmogorov-Smirnov, Hamming, Cosine, Pearson and Jaccard metrics. As known, a Kolmogorov-Smirnov metric is for quantifying distribution functions of two models. A Hamming metric is for quantifying a Hamming distance, which is a number of positions at which the corresponding symbols in two strings of symbols with equal lengths are different. A cosine metric is for measuring similarity between two vectors of an inner product space that measures the cosine of the angle between them. A Pearson metric is for measuring the correlation between two models, e.g., how well the two models fit a line. A Jaccard metric is for measuring similarity between finite sample sets, and is defined as the size of the intersection divided by the size of the union of the samples in two models.

In some embodiments, the clustering module 815 identifies all models that are within a threshold measurement difference (a similarity threshold) from the highest ranked model and groups these models and the top ranked model into a single cluster. In some embodiments, the clustering module 815 removes the clustered models from the pool of models for the dataset, and the ranking module 810 and the clustering module 815 repeat the ranking, clustering and removing operations on the remaining models in the pool until the models in the pool are exhausted. In this manner, the ranking module 810 and the clustering module 815 reduce the number of models for a user (e.g., an analyst) to interpret. That is, the ranking module 810 and the clustering module 815 rapidly analyze the models such that only those models from which interesting insights are likely be drawn are presented to an analyst to consider. This is one of the improvements that the embodiments of the invention provides over how EDA has been done so far—an analyst inspecting each of the numerous models (e.g., thousands to hundreds of thousand models) to draw certain meaningful or interesting insights from the models.

Figure 9:
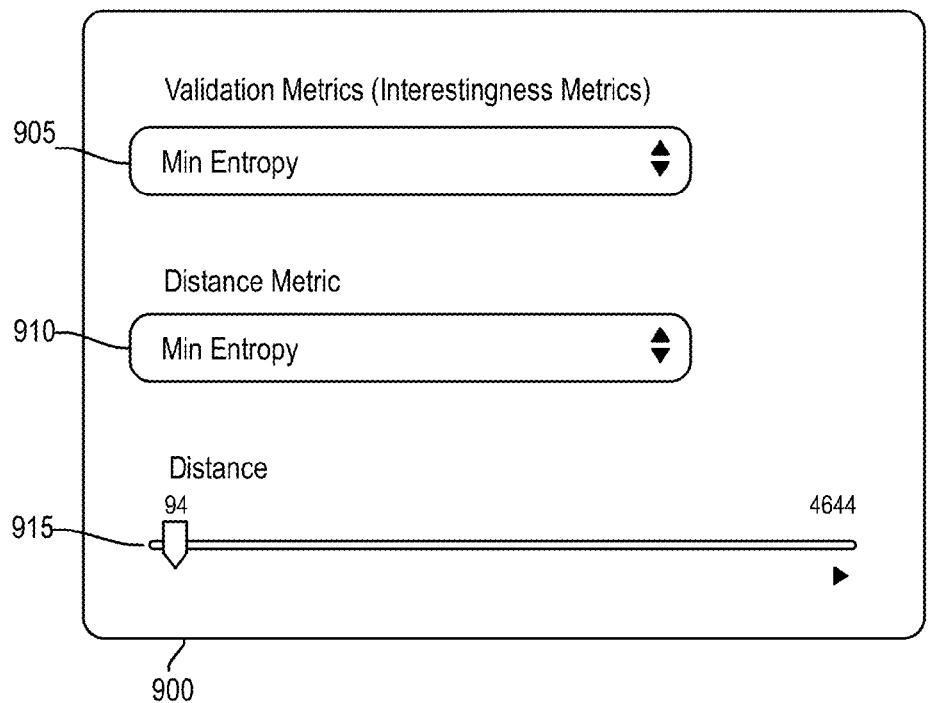
FIG. 9 depicts a user interface tool according to some embodiments of the invention.

The presentation module 820 presents the clusters of models to a user. In some embodiments, the presentation module 820 displays the cluster of models as a single model so that the user or the analyst does not have to interpret all the models generated for the given dataset. In some embodiments, the presentation module 820 also provides a UI tool that allows the user to select the ranking metric and the similarity metric and to adjust the similarity threshold. FIG. 9 depicts an example layout of such a UI tool. Specifically, FIG. 9 shows a UI tool 900 that includes two drop down menus 905 and 910 for selecting ranking metric and similarity metric, respectively. The UI tool 900 also has a slider 915 for adjusting the similarity threshold. When the similarity threshold is adjusted, the clustering module 815 dynamically re-clusters the models in the pool based on the adjusted similarity threshold. It should be recognized the UI tool 900 may be implemented in many other different layouts. For instance, radio buttons may replace the drop-down menus 915 and 910, and an input window for receiving alphanumeric values of the similarity threshold may replace the slider 915.

Referring back to FIG. 8, each of the modules of the model analysis system 800, namely, the models repository 805, the ranking module 810, the clustering module 815, and the presentation module 820 may be an application specific integrated circuit, an electronic circuit, a processor (shared, dedicated, or group) and memory that executes one or more software or firmware programs, or a combinational logic circuit in a server. For example, in some embodiments, the ranking module 810 may be communicatively connected (e.g., through a bus 856) to a memory 852 to store and retrieve the ranking metrics. Likewise, the clustering module 815 may be communicatively connected to the memory 852 to store and retrieve the similarity metrics. The presentation module 820 may use an I/O interface 854 to facilitate user interaction with the UI tool 900. The presentation module 820 may also use a display 860 to present the analysis options to the user. The clustering module 815 may use a processor 858 to deploy queries. In some embodiments, the modules of the model analysis system 800 may be combined or further partitioned. Also, the modules of the model analysis system 800 may be implemented in more than one physical machine in a distributed fashion. Moreover, the model analysis system 800 and the data analysis system 100 may be combined into a single system that automatically generates models from a dataset and rapidly analyzes the generated models.

Figure 10:
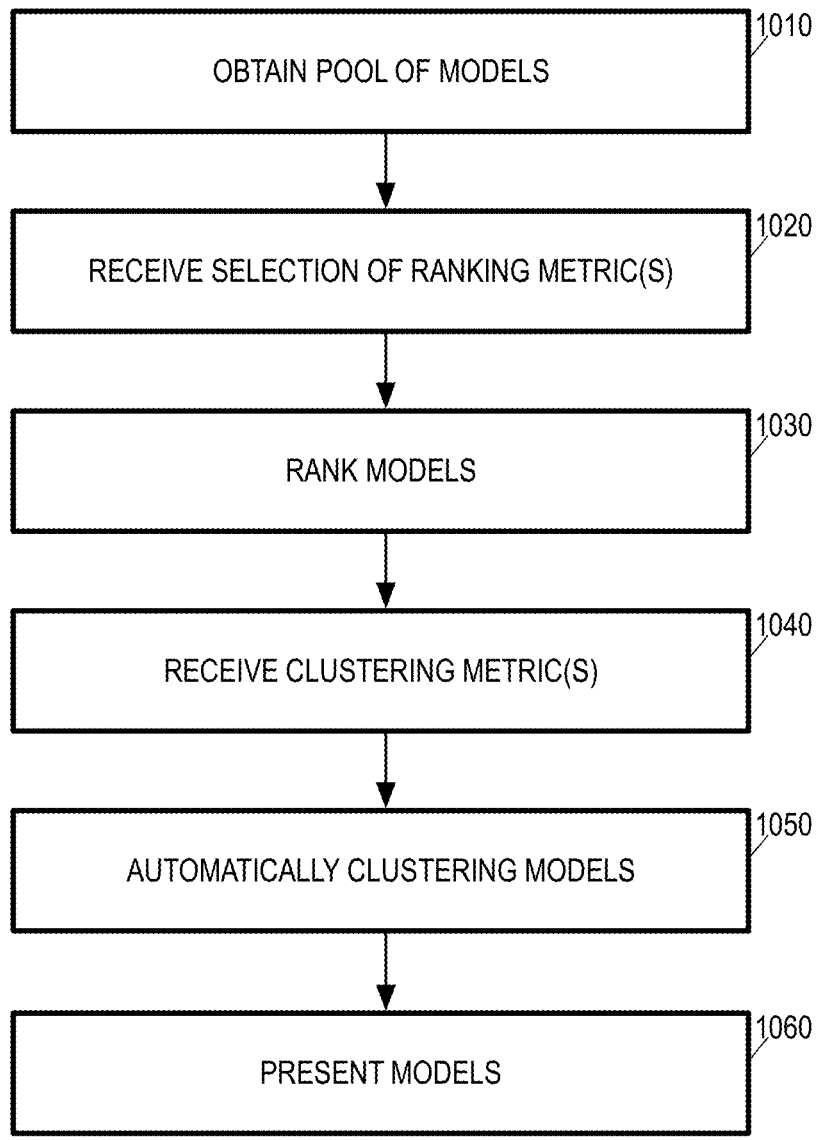
FIG. 10 depicts a process flow for automatically and rapidly analyzing models according to some embodiments of the invention.

FIG. 10 illustrates a process flow for automatically and rapidly analyzing models generated from a given dataset. In some embodiments, the model analysis system 800 of FIG. 8 performs the process flow shown in FIG. 10. At block 1010, the model analysis system 800 obtains a pool of models generated from a dataset.

At block 1020, the model analysis system 800 optionally receives a selection of ranking metric among the available ranking metrics. Specifically, the model analysis system 800 may provide a selection mechanism (e.g., a drop-down menu) in a UI tool to allow a user to select a ranking metric. The model analysis system 800 then ranks at block 1030 the models in the pool of models using the ranking metric selected at block 1020 or using one or more default ranking metrics.

At block 1040, the model analysis system 800 optionally receives a selection of a similarity metric among the available similarity metrics. Specifically, the model analysis system 800 provides a selection mechanism (e.g., a drop-down menu) in the UI tool to allow the user to select a similarity metric. The model analysis system 800 also provides an adjustment mechanism (e.g., a slider) in the UI tool to allow the user to adjust or set the similarity threshold.

At block 1050, the model analysis system 800 then groups at block 1050 a set of models into a single model based on the similarities among the models. Specifically, the model analysis system 800 identifies all models that are within the similarity threshold from the highest ranked model in the pool of models and group the identified models and the highest ranked model into a cluster. In some embodiments, the model analysis system 800 repeats the block 1050 until all models in the pool are grouped into clusters of models. In some embodiments, the model analysis system 800 may combine two or more models into a new pool of models, rank the models in the new pool using a different ranking metric, and create new clusters of models. In some embodiments, the model analysis system 800 may split a cluster into two or more clusters, rank the models in a split cluster using a different metric, and create new clusters of models.

At block 1060, the model analysis system 800 presents the clusters of models to the user. The user then interprets the clusters of the models instead of interpreting individual models.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for analyzing data, the computer program product comprising a computer readable storage medium having program instructions embodied therewith, the program instructions readable by a processing circuit to cause the processing circuit to perform a method comprising:

obtaining a description of a dataset;

automatically generating, by a computer, a plurality of analysis options comprising all possible analysis options for the dataset from the description of the dataset, wherein each of the plurality of analysis options comprises one or more of data filtering conditions, database clauses, statistical functions and model-specific functions;

displaying, by a display, to a user, the plurality of analysis options in a tree layout, wherein the tree layout comprises a plurality of nodes including a plurality of roots and a plurality of leaves connected by a plurality of paths; and wherein each node in the tree layout represents a different one of each of the one or more data filtering conditions, database clauses, statistical functions and model-specific functions, and each path from a root to a leaf represents an analysis option from the plurality of analysis options;

upon confirmation of the displayed analysis options by the user, generating a plurality of queries based on the analysis options displayed in the tree layout, wherein one query is generated for each of the plurality of analysis options and includes each of the one or more data filtering conditions, database clauses, statistical functions and model-specific functions for the respective analysis option; and generating one or more models by deploying the queries on the dataset.

2. The computer program product of claim 1, wherein the dataset is in a database format, and the description of a dataset includes a database schema.

3. The computer program product of claim 1, wherein the method further comprises allowing a user to remove one or more analysis options before the confirming and the generating the queries from the analysis options.

4. The computer program product of claim 1, wherein the queries comprise database queries.

5. The computer program product of claim 1, wherein the method further comprises reusing the queries to analyze another dataset.

* * * * *